United States Patent
Szuster

(10) Patent No.: US 8,146,618 B2
(45) Date of Patent: Apr. 3, 2012

(54) BALL NON-RETURN VALVE

(75) Inventor: Miroslaw Szuster, Biala (PL)

(73) Assignee: Miroslaw Szuster, Biala (PL)

( * ) Notice: Subject to any disclaimer, the term of this patent is extended or adjusted under 35 U.S.C. 154(b) by 347 days.

(21) Appl. No.: 11/920,529

(22) PCT Filed: May 16, 2006

(86) PCT No.: PCT/PL2006/000033
§ 371 (c)(1),
(2), (4) Date: Nov. 15, 2007

(87) PCT Pub. No.: WO2006/123959
PCT Pub. Date: Nov. 23, 2006

(65) Prior Publication Data
US 2009/0038694 A1 Feb. 12, 2009

(30) Foreign Application Priority Data
May 17, 2005 (PL) .......................... 375169

(51) Int. Cl.
*F16K 15/04* (2006.01)
(52) U.S. Cl. .............................. 137/533.11; 137/533.13
(58) Field of Classification Search ............ 137/533.11, 137/533.13, 515.5
See application file for complete search history.

(56) References Cited

U.S. PATENT DOCUMENTS

| 1,674,879 A * | 6/1928 | Atkinson ................. 137/533.21 |
| 1,749,098 A | 3/1930 | Boosey |
| 2,103,427 A | 12/1937 | Long |
| 3,741,243 A * | 6/1973 | Deibler et al. ................. 137/528 |
| 4,422,472 A | 12/1983 | Klein |
| 4,687,023 A | 8/1987 | Harbison et al. |
| 5,709,242 A | 1/1998 | Bergen et al. |

FOREIGN PATENT DOCUMENTS

| DE | 3010527 A1 | 10/1980 |
| GB | 3436806 A | 10/1935 |
| WO | WO 96/12129 | 4/1996 |
| WO | 0231391 | 4/2002 |
| WO | WO 2007/097651 | 8/2007 |

OTHER PUBLICATIONS

International Search Report issued by the International Searching Authority (ISA/EP) on Sep. 19, 2006 in connection with International Application No. PCT/PL2006/000033.
Fabryka Armatur Jafar SA: "Ball Check Valve Elbow Szuster System", [Online] Mar. 2, 2006.
International Search Report for PCT International Application No. PCT/PL2007/000008, published Aug. 30, 2007.
Nov. 9, 2010 Office Action issued in connection with U.S. Appl. No. 12/224,186, filed Dec. 15, 2008.

* cited by examiner

*Primary Examiner* — Kevin Lee
*Assistant Examiner* — Macade Brown
(74) *Attorney, Agent, or Firm* — Gary J. Gershik; Cooper & Dunham LLP

(57) ABSTRACT

In the valve according to the invention the supporting blind (6) of the deflected channel (5) is terminated at its free ends with the oblique surfaces (10), and the guiding rail (7) of the ball (4) is terminated with the supporting directional arrangement (8) directing the ball (4) toward the supporting blind (6) of the deflected channel (5), and the top (9), which is positioned closer to the valve outlet than to the inlet, and together with the oblique surfaces (10) of the supporting blind (6) of the deflected channel (5) produce a slot (11) widening itself to the direction of deflected channel (5) interior.

14 Claims, 4 Drawing Sheets

BALL NON-RETURN VALVE

Figure 1:
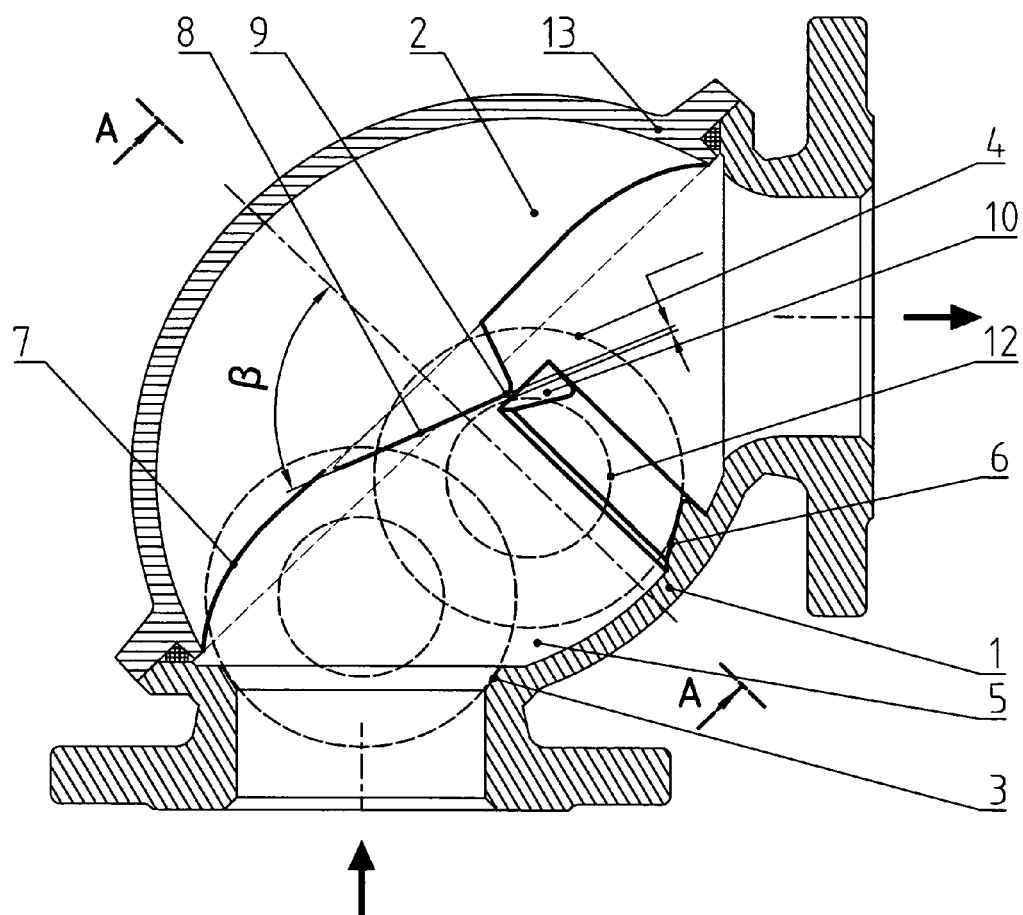

The subject of the invention is a ball non-return valve, especially for waste water pumping stations both with and without faecal matter. Additionally it can be used in other pumping installations both on the pressure and suction sides, for potable water, industrial water as well as in hydraulic and pneumatic transport installations.

It is known from the description in P-313436 Polish patent application a non-return valve with a ball valve body, that has a casing provided with a flow-through channel with an outlet and with an inlet terminated with a ring seat, in which the ball valve body settles in closed position, and additionally provided with a deflected channel, greater in diameter than the ball valve body, that is placed there when in open position, while at the inlet, in place of the deflected channel junction with the flow-through channel, as well as in front of the outlet the channel has an extended cross-section of the flowing space and between these extended cross-sections of the flowing space there is a central part of the flow-through channel formed by two symmetrical internal bulges of the casing wall, that create a ball guiding rail, and an external bulge of the casing wall protruding to the opposite direction than the ball, when in fully open, position. The deflected channel of this valve has a supporting blind, that settles the ball in its fully opened position. This valve can be produced in three basic versions with regard to the place of the deflected channel blind fastening. The blind can be durably fastened to the guiding rail of the elbow-shaped cover, to the cleanout cover or to the deflected channel of the valve casing. Disadvantage of such solution consists in that for a shortened valve version it is not possible to execute correctly the ball guiding from the close position to the fully opened position, because the ball adheres to the guiding edge and is not able to settle in the supporting seat and principally tightly close the flow through the deflected channel, what can lead to the ball obstruction in the deflected channel by the solids contained in waste water. Another drawback related to the lengthened valve version consists in that for long lasting pumping operations in the range of several hours with waste water flow through the valve it is possible for the ball to be sucked in the seat to such extent, that at the moment of the pump stop the ball return is delayed, what can cause a stronger water hammer.

As a result of many years examinations of these valves constructions the new efficient solutions have been developed that eliminate previously discovered disadvantages.

The valve according to the invention is characterized in that the deflected channel supporting blind is at its free ends terminated with oblique surfaces, and ball guiding rail is terminated with a supporting directional arrangement, directing the ball toward the deflected channel supporting blind, and the top of which is positioned closer to the valve outlet than to the inlet, and together with the oblique surfaces of the deflected channel blind produce a slot widening itself to the direction of the deflected channel interior.

The ball in the fully opened position is provided with some possibility to deflect freely, perpendicularly to the axis of the flowing space of the flow-through channel central part, by a quantity of the clearance between the supporting directional arrangement edge and the trajectory of the ball rolling along this edge, that amounts from 1% to 10% of the quantity of the ball diameter.

There is an acute angle, enclosed between the supporting directional arrangement edge and a straight line conducted in parallel to the straight running through the ball centre in its fully opened position and perpendicularly to the axis of the flowing space of the flow-through channel central part, at which the ball is directed, when it moves on the supporting directional arrangement along its rolling trajectory until having reached a contact with the supporting blind, which the angle amounts 35°-90°.

To the best advantage this angle amounts 45°-80°.

To the best advantage the casing is provided with a cover, that has free ends of the supporting blind provided with the oblique surfaces or ends of the supporting directional arrangement, terminated with tops, sticking out beyond the outline of its flange.

In order to eliminate assembling incorrectness the cover is provided at least with one ear, at one side of the casing, having a riser entering a hollow in the casing.

The supporting blind can be provided, at its central part, with a rinsing groove.

For a special realization of the valve its casing is provided with at least two pairs of attachments for fastening inside them the blocking component, that is inserted between the attachments and the cover flange after having the gasket depressed by the flange with the maximum strength.

For convenience during cover mounting and dismounting there are incisions in the cover flange.

In order to eliminate the blocking component slipping out of the attachments there is an opening at least in one attachment, into which a cotter pin is inserted, that is conducted also through the blocking component.

The valve ball is to the best advantage made with a solid core of a rubber-like resin or with a metallic core covered with a rubber-like resin and joint by means of a layer of a cementing material with a rubber cover of reduced hardiness.

The essential advantage of the valve according to the invention is that the valve opens under low flow speeds, what makes possible its use in the pumping stations for waste water with faecal matter content, as well as makes possible its use in the pumping stations placed in buildings, because the ball does not get into vibrations over the whole range of the recommended waste water flow speeds. Owing to the ball being provided in its fully opened position with the possibility to make freely some deflections in the direction perpendicular to the flowing space axis in the flow-through channel central part, the ball is secured against the possibility of being sucked by the flow at the supporting blind.

Figure 2:
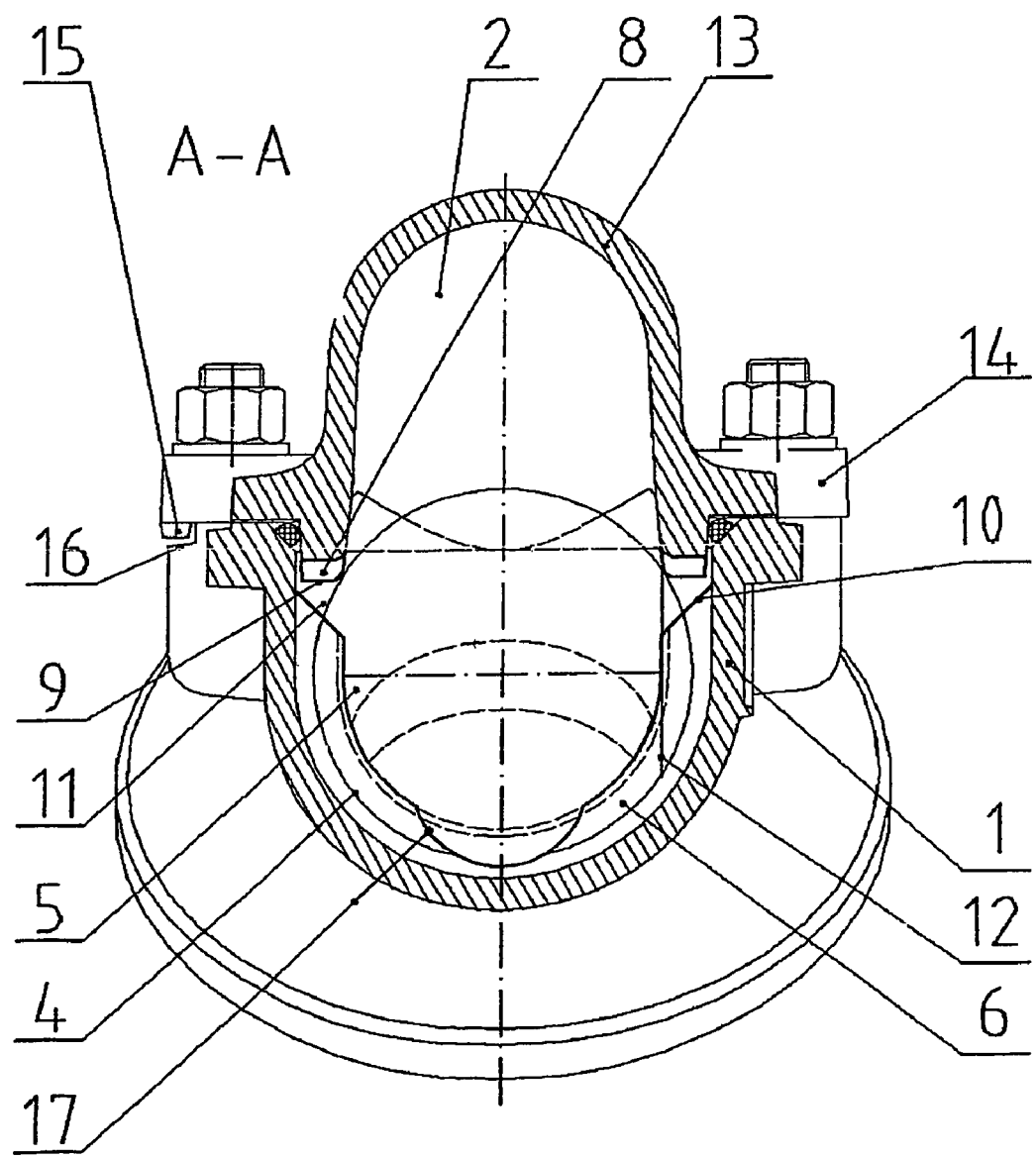
Figure 3:
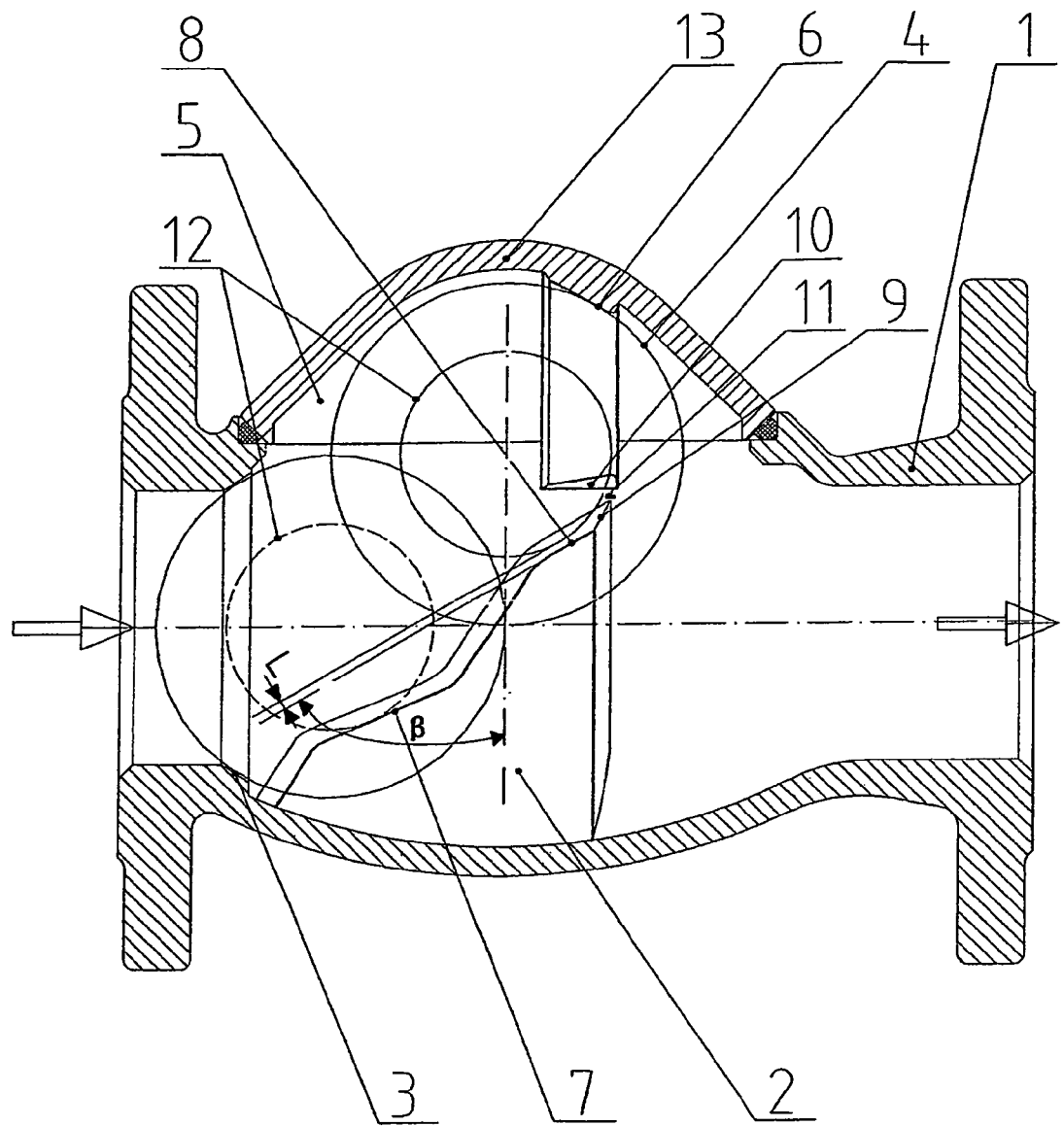
Figure 4:
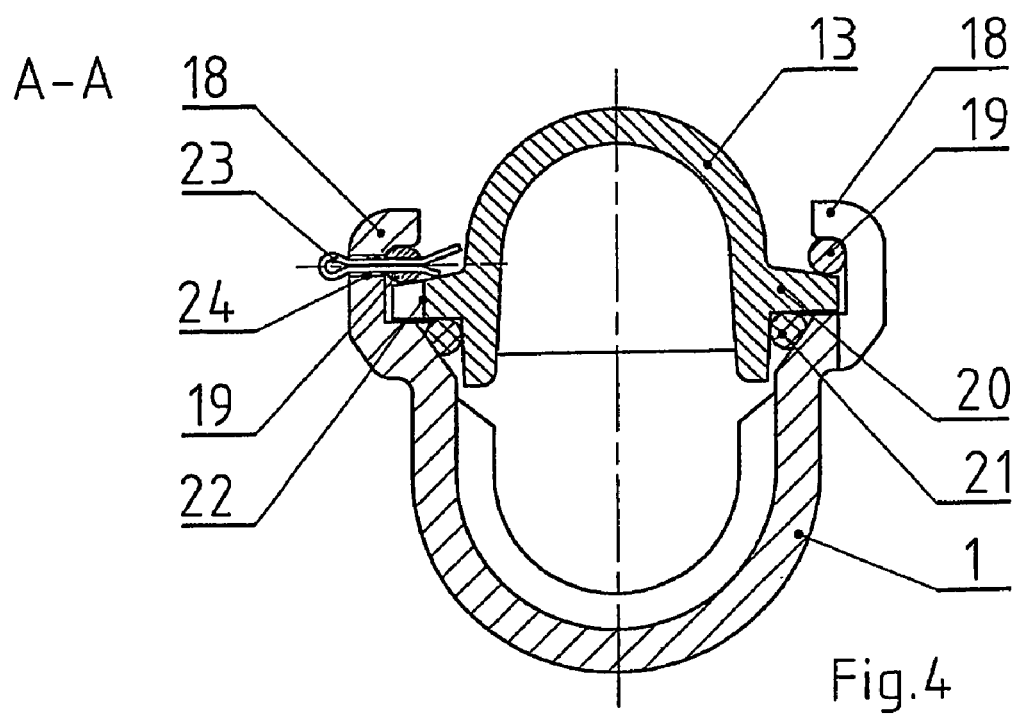
Figure 5:
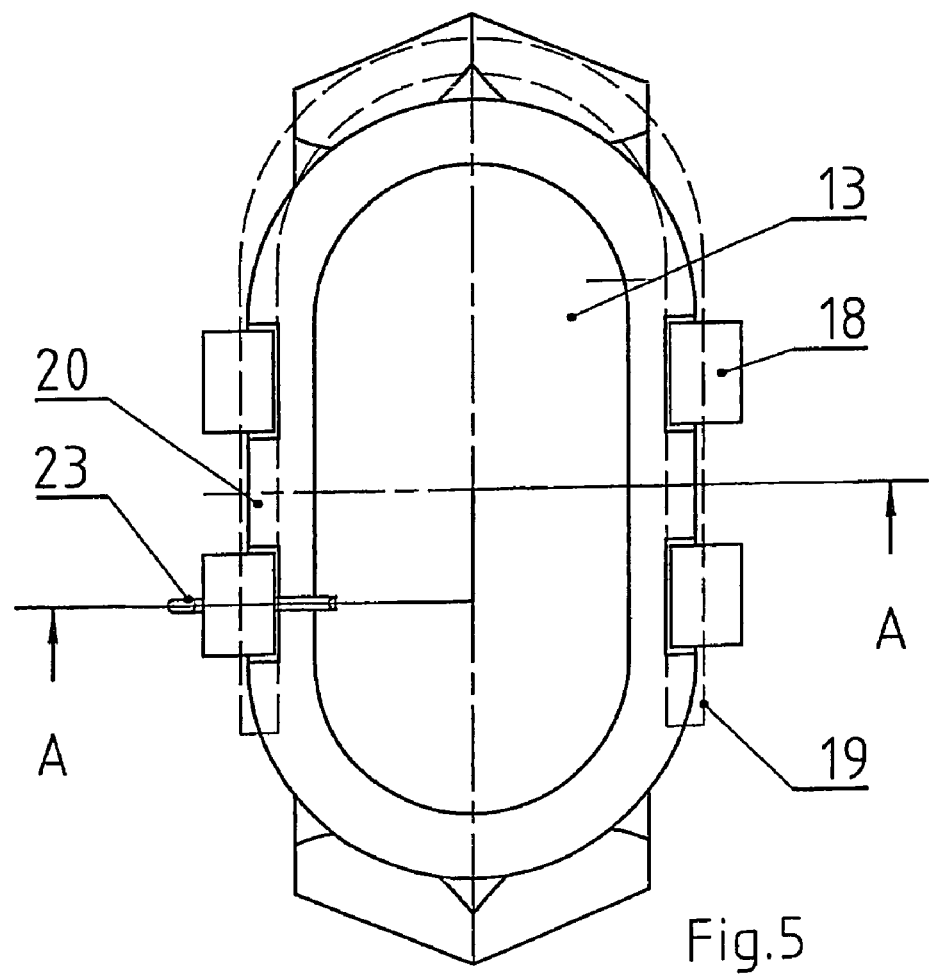

The subject of the invention is presented in a form of realization examples in the drawing, where FIG. 1 represents a longitudinal sectional view of the non-return valve casing in angle (elbow) realization, FIG. 2—a cross-sectional view of the casing of the valve from FIG. 1, FIG. 3—a cross-sectional view of the casing of the valve in line realization, FIG. 4—a cross-sectional view of a valve casing in a screw-free realization of the connection with the cover, FIG. 5—a top view of the valve casing in the screw-free realization of the connection with the cover.

A non-return valve according to the invention presented in FIG. 1-5 has a casing 1 provided with a flow-through channel 2 with an outlet and with an inlet terminated with a ring seat 3, in which the ball 4 settles in a closed position, and additionally provided with a deflected channel 5 greater in diameter than the ball 4, that is placed there when in open position.

At the inlet, in place of the deflected channel 5 junction with the flow-through channel 2, as well as in front of the outlet the channel has an extended cross-section of the flowing space and between these extended cross-sections of the flowing space there is a central part of the flow-through channel 2, whereas the deflected channel 5 has a supporting blind 6, equal approximately in a clearance to the diameter of the inlet opening of the casing 1, that settles the ball in its fully opened position. The central part of the flow-through channel 2 is formed by two symmetrical internal bulges of the casing 1 wall, that create the guiding rail 7 of the ball 4, and an external bulge of the casing 1 wall protruding to the opposite direction than the ball 4, when in fully open position. Along the guiding rail 7 the ball 4 can be moved from the closed position to the opened position and vice versa. The guiding rail 7 of the ball 4 has the supporting directional arrangement 8, terminated with the top 9, that is positioned closer to the valve outlet than to the inlet. The supporting blind 8 of the deflected channel 5 is terminated at its free ends with the oblique surfaces 10. The top 9 of the supporting directional arrangement 8 together with the oblique surfaces 10 of the supporting blind 6 of the deflected channel 5 produce the slot 11 in a form of a wedge extending oneself toward the deflected channel 5 interior. Due to such a manner of the slot 11 shape, together with shifting the top 9 of the supporting directional arrangement 8 toward the flow-through channel 2 outlet, the ball 4 floating in the flow is additionally deflected from the flow main stream until it rests upon the supporting directional arrangement 8 and the supporting blind 6. Additionally the ball 4 in such a position of full openness is provided with the possibility to make some free deflections in the direction perpendicular to the flow axis of the central part of the flow-through channel 2 by the amount L of the clearance between the edge of the supporting directional arrangement 8 and the trajectory 12 of the ball 4 rolling along this edge, that amounts from 1% to 10% of the amount of the ball 4 diameter. For rapid and reliable settling of the ball 4 on the supporting blind 6 of some importance is a acute angle $\beta$, enclosed between the edge of the supporting directional arrangement 10 and a straight line conducted in parallel to the straight running through the ball 4 centre in its fully opened position and perpendicularly to the axis of the flowing space of the flow-through channel 2 central part, at which the ball 4 is directed, when it moves on the supporting directional arrangement 8 along the trajectory 12 of its rolling until reaching a contact with the supporting blind 6, which the angle amounts from 35° to 90°, and to the best advantage from 45° to 80°.

The valve according to the invention, presented in FIG. 1, 2, 3 to the best advantage is provided with the cover 13, that has free ends of the supporting blind 6 provided with the oblique surfaces 10 or ends of the supporting directional arrangement 8, terminated with tops 9, sticking out beyond the outline of its flange. In order to eliminate assembling incorrectness at least with one ear 14 of the cover 13, at one side of the casing 1, has a riser 15 entering a hollow 16 in the casing 1. For rinsing the bottom of the deflected channel 5 the supporting blind 6 is provided in its central part with a rinsing groove 17.

The valve according to the invention, presented in FIGS. 4 and 5 has the cover 13 fastened to the casing 1 by means of at least two pairs of attachments 13, where the blocking component 19 is fastened by inserting between the attachments 18 and the flange 20 of the cover 13 after having the gasket 21 depressed to the maximum extent by the flange 20. The cover 13 mounting and dismounting is made easy owing to the incisions 22. Possible slipping of the blocking component 19 is prevented by means of the cotter pin 23 conducted also through the blocking component 19. The valve according to the invention realization, presented in FIGS. 4 and 5 is preferred especially for such a casing material, as the spheroidal cast iron for small and largest passages and plastics for small valves, while the realization in accordance with FIG. 1, 2, 3 is more suitable for the casing made of grey cast iron. The valves according to the invention, presented in FIG. 1, 2 can be operated practically in any position and depending on the position they need only the ball 4 to be the drowning ball or the floating one. The ball 4 of the valve is to the best advantage made with solid core of the rubber-like resin or with metallic core covered with rubber-like resin joint by means of glue with the rubber cover of reduced hardness.

Examples of valve according to the invention realization, presented above, do not exhaust all the realization and application possibilities included in the patent claims from 1 to 11.

The invention claimed is:

1. A ball non-return valve comprising:
   a) a ball (4), and
   b) a casing (1) comprising
      i) a flow-through channel with an outlet and an inlet terminated with a ring seat into which the ball (4) is settled when in the closed position,
      ii) a deflected channel (5) greater in diameter than the ball into which the ball is placed when in the open position,
      iii) a ball guiding rail (7) formed by two symmetrical internal bulges of the casing wall, wherein the ball guiding rail is positioned in a central part of the casing between the inlet and the outlet and extending from a junction of the flow-through channel and the deflected channel toward the outlet,
      iv) an external bulge of the casing wall protruding to the direction opposite the ball when in the fully open position,
      v) a supporting blind (6) terminated at its free ends with oblique surfaces (10) and positioned in the deflected channel, wherein the supporting blind settles the ball in the deflected channel in the fully open position, and
      vi) a supporting directional arrangement (8) extending from the ball guiding rail (7) and having a top (9) which is positioned closer to the valve outlet than to the inlet, wherein the supporting directional arrangement (8) directs the ball (4) toward the supporting blind (6) of the deflected channel (5), and wherein the supporting directional arrangement (8) together with the oblique surfaces (10) of the supporting blind (6) of the deflected channel (5) produces a slot (11) widening itself to the direction of the deflected channel (5) interior, and wherein the supporting directional arrangement (8) and the supporting blind (6) together are capable of contacting the ball at more than three points when the ball is in the fully open position.

2. The valve according to claim 1 wherein the acute angle ($\beta$) is enclosed between an edge of the supporting directional arrangement (8) and a straight line conducted in parallel to a straight line running through the centre of the ball (4) when the ball is in the fully open position and perpendicularly to the axis of the flowing space of the central part of the flow-through channel (2) is 35°-90°.

3. The valve according to claim 2, wherein the acute angle ($\beta$) is 45°-80°.

4. The valve according to claim 1, wherein the casing (1) further comprises a cover (13) having a flange, and wherein the free ends of the supporting blind (6) provided with the oblique surfaces (10) or ends of the supporting directional arrangement (8), terminated with tops (9), stick out beyond the outline of the flange.

5. The valve according to claim 4 wherein the cover (13) is provided at least with one ear (14), at one side of the casing (1), having a riser (15) entering a hollow (16) in the casing (1).

6. The valve according to claim 1 wherein the supporting blind (6) is provided, at its central part, with a rinsing groove (17).

7. The valve according to claim 1 wherein the casing (1) is provided with at least two pairs of attachments (18) for fastening inside them a blocking component (19), that is inserted between the attachments (18) and a flange (20) of a cover (13) after having a gasket (21) depressed by the flange (20).

8. The valve according to claim 7 wherein there are incisions (22) in the flange (20) of the cover (13).

9. The valve according to claim 7 wherein there is an opening (24) at least in one attachment (18), into which a cotter pin (23) is inserted, that is conducted also through the blocking component (19).

10. The valve according to claim 1 wherein the ball (4) is made with a solid core of a rubber-like resin or with a metallic core covered with a rubber-like resin and joined by means of a layer of a cementing material with a rubber cover of reduced hardness.

11. The valve according to claim 1 wherein the ball (4) in the fully open position is able to deflect freely, perpendicularly to the axis of a flowing space in the central part of the flow-through channel, by a quantity of the clearance (L) between the edge of the supporting directional arrangement (8) and the trajectory (12) of the ball (4) rolling along this edge, that amounts from 1% to 10% of the quantity of the ball (4) diameter.

12. The valve according to claim 1, wherein the casing is made of spheroidal cast iron, grey cast iron, or plastic.

13. The valve according to claim 1, wherein the casing is in angle configuration.

14. The valve according to claim 1, wherein the casing is in line configuration.

* * * * *